United States Patent
Li et al.

(10) Patent No.: US 9,131,497 B1
(45) Date of Patent: Sep. 8, 2015

(54) METHOD AND SYSTEM OF ADMISSION CONTROL FOR WIRELESS TRAIN COMMUNICATION SYSTEM

(75) Inventors: Jia-Ru Li, San Jose, CA (US); Yueh-Ju Lee, Saratoga, CA (US)

(73) Assignee: Lilee Systems, LTD, San Jose, CA (US)

( * ) Notice: Subject to any disclaimer, the term of this patent is extended or adjusted under 35 U.S.C. 154(b) by 630 days.

(21) Appl. No.: 13/442,890

(22) Filed: Apr. 10, 2012

(51) Int. Cl.
*H04W 72/04* (2009.01)

(52) U.S. Cl.
CPC ...... *H04W 72/0446* (2013.01); *H04W 72/0493* (2013.01)

(58) Field of Classification Search
None
See application file for complete search history.

(56) References Cited

U.S. PATENT DOCUMENTS

| | | | |
|---|---|---|---|
| 5,732,351 A * | 3/1998 | Olds et al. | 370/331 |
| 6,570,861 B1 * | 5/2003 | Marsan et al. | 370/330 |
| 2005/0190741 A1 * | 9/2005 | Pettersson | 370/350 |
| 2006/0258382 A1 * | 11/2006 | Zhang et al. | 455/501 |
| 2007/0104214 A1 * | 5/2007 | Hsieh et al. | 370/458 |
| 2007/0173271 A1 * | 7/2007 | Hulkkonen et al. | 455/509 |
| 2008/0009280 A1 * | 1/2008 | Ushiki et al. | 455/425 |
| 2011/0075641 A1 * | 3/2011 | Siriwongpairat et al. | 370/337 |
| 2011/0183698 A1 * | 7/2011 | Hoctor et al. | 455/509 |
| 2013/0128932 A1 * | 5/2013 | Huang et al. | 455/73 |

* cited by examiner

*Primary Examiner* — Chirag Shah
*Assistant Examiner* — Joshua Smith
(74) *Attorney, Agent, or Firm* — Blairtech Solution LLC (57) ABSTRACT

A method and apparatus for admission control in a wireless train communication system with TDMA are disclosed. The method and apparatus according to one embodiment of the present invention identifies neighboring devices within neighborhood of a given device that use the time slot. The frequency and location information for the intended device and the unintended devices are used to determine whether to grant the time slot. In another embodiment according to the present invention, the receive signal strength information at the neighboring devices is used, instead of the distance information, for admission control.

17 Claims, 6 Drawing Sheets

METHOD AND SYSTEM OF ADMISSION CONTROL FOR WIRELESS TRAIN COMMUNICATION SYSTEM

CROSS REFERENCE TO RELATED APPLICATIONS

The present invention is related to PCT Patent Application, No. PCT/US11/58399, filed Oct. 28, 2011, entitled "SYSTEM AND METHOD OF FREQUENCY OFFSET COMPENSATION FOR RADIO SYSTEM WITH FAST DOPPLER SHIFT". The PCT Patent Application is hereby incorporated by reference in its entirety.

FIELD OF THE INVENTION

The present invention relates to system architecture and network performance for a wireless train communication system. In particular, this invention relates to admission control for locomotives in a TDMA-based wireless communication system incorporating centralized time slot assignment.

BACKGROUND

In a wireless train communication system, such as the Positive Train Control (PTC) system, a fast-travelling locomotive communicates with base stations and wayside devices (also called track-side) through radio links. A spectrum at 220 MHz has been allocated for the wireless PTC application, where time division multiple access (TDMA) is selected as the underlying media access (MAC) technology to provide a pair of reliable point-to-point TX/RX communication links for a selected locomotive to communicate with an intended base stations. In the PTC system, multiple channels are used by different base stations to segregate the traffic from different locomotives into different channels. This technique can improve the overall network capacity and throughput significantly. In a hypothetic ideal communication system, a radio receiver could use a band-pass filter to only allow in-band signal to pass and to fully reject the signal in adjacent channels. Nevertheless, it is not practical to design such boxcar-type filters. Therefore, while the band-pass filter used in a receiver can substantially suppress out of band signal, there is always a small amount signal leakage from adjacent channels. If the adjacent channel signal is very strong, the leak-through signal from adjacent channels may become substantial and may affect the performance of the intended signal. On the other hand, a transmitter always has out of band leakage where a small amount of signal is radiated outside the allowed or intended spectrum, which may be caused by system phase noise and/or other system impairments. Accordingly, the issue of adjacent channel interference always exits and should be taken into consideration for reliable system design.

In the PTC system, the base stations are stationary and the channels may be pre-assigned to minimize potential interference among base stations. However, the locomotives are mobile. When a locomotive, transmitting at an adjacent channel associated with a base station, passes by the base station, the transmitted signal from the locomotive may be perceived as a strong interference signal at an adjacent channel. Therefore, the intended signal to be received by the base station may be temporarily affected by the transmitted from the locomotive. Similarly, the signal from the base station may also affect the intended signal to be received by the locomotive when the locomotive is close to the base station if the base station is transmitting at an adjacent channel. In the PTC system, the interference is intensified because train control network usually comprises base stations with highly overlapped area for redundancy purposes. Therefore, a good system design should dynamically assess potential interferences from adjacent channels and allow a device to transmit only if good signal quality is available.

BRIEF SUMMARY OF THE INVENTION

A method and apparatus for admission control in a wireless train communication system with TDMA are disclosed. The method and apparatus according to one embodiment of the present invention comprise: identifying an intended device for a given device, wherein the intended device communicates with the given device on a first frequency; identifying a time slot associated with a communication link in a TDMA frame; identifying unintended devices within neighborhood of the given device that use the time slot; collecting second frequency information for each unintended device, wherein a second frequency is associated with each unintended device; collecting first location information associated with the intended device, wherein the intended device is at first location; collecting second location information associated with each unintended device, wherein each unintended device is at second location; and determining whether to grant the time slot based on the first frequency, the second frequencies associated with the unintended devices, the first location, and the second locations associated with the unintended devices. In one embodiment, whether to grant the time slot is based on frequency differences, wherein each frequency difference corresponds to first difference between the first frequency and each second frequency. A first group is identified and wherein the first group comprises the unintended devices having corresponding frequency differences less than a first frequency threshold. If any of the unintended devices in the first group is within a pre-determined distance from the given device, adjacent channel interference may exist and the time slot is not allowed. Otherwise, the time slot is allowed. In another embodiment of the present invention, additional signal quality assessment is performed before allowing the time slot.

In another embodiment according to the present invention, the receive signal strength is used instead of the distance information for signal quality assessment. In the receive signal strength based approach, the time slot is not granted if any of first signal difference for the unintended devices in the first group is smaller than a first signal threshold, wherein each first signal difference corresponds to difference between the first receive signal strength and each second receive signal strength. Otherwise, the time slot is allowed. In yet another embodiment of the present invention, additional signal quality assessment based on first signal difference is performed before allowing the time slot.

DETAILED DESCRIPTION OF THE INVENTION

In the wireless train communication system, the particular radio system configuration poses a great challenge to the system design. For example, the spectrum used for PTC application is a very precious resource and the number of channels available is very limited. Therefore, the use of the spectrum has to be very efficient and the guard band between adjacent channels may be very small. On the other hand, the transmitter has to radiate enough power to cover a wide terrain. In most reliability requirement for railroad, two times or three times over-coverage is required. Due to phase noise and other impairments, a portion of the transmitted signal often spills into adjacent channel. Furthermore, the receiver filter is unable to fully suppress signal from adjacent channels. Consequently, the wireless train communication system is susceptible to adjacent channel interference. Since the locomotive travels at high speed, the distances from the locomotive to its neighboring base stations change from time to time. A radio link may become affected by adjacent channel interference when an unintended device is radiating a strong signal at an adjacent channel. Therefore, a reliable wireless train communication system has to be designed to take into consideration of the rapid environment change due to fast moving locomotives.

Figure 1:
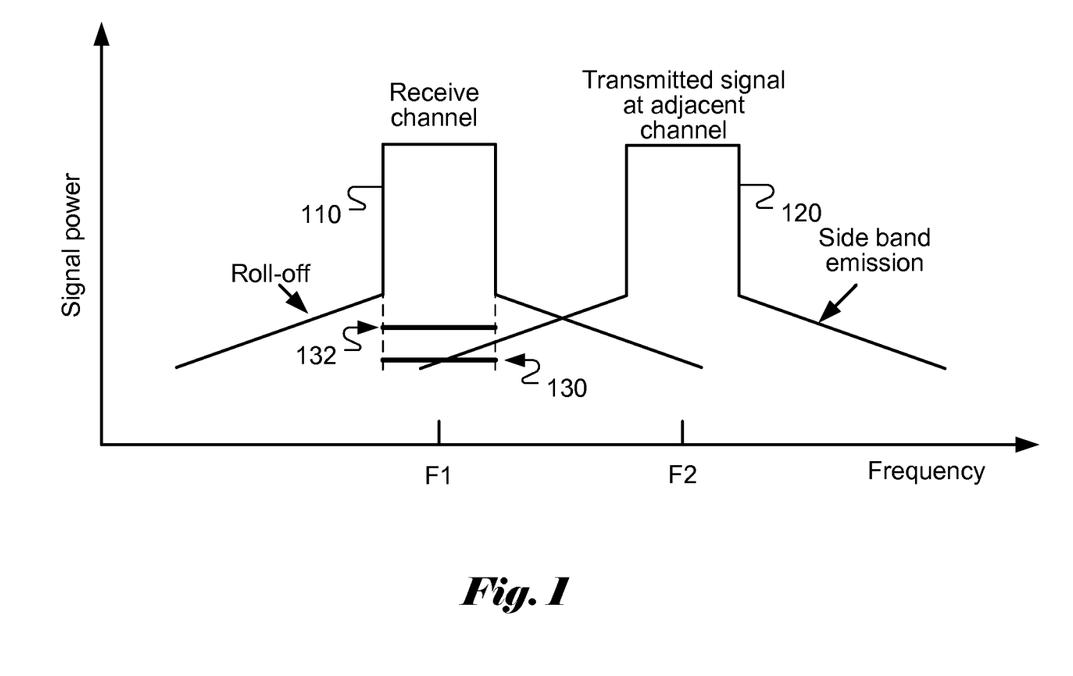
FIG. 1 illustrates an example of receiver filter response and transmitter power spectrum that may cause adjacent channel interference.

FIG. 1 illustrates an example of adjacent channel interference, where F1 is the intended channel to receive a desired signal while F2 is an adjacent channel. The figure is meant to demonstrate the adjacent channel interference issue and may not be drawn to scale. The receiver filter 110 allows the intended signal to be received. A boxcar-type filter will be able to fully suppress any out of band signal. Nevertheless, such ideal band-pass is impractical to implement. Any practical filter design will result in more or less some out of band leakage. Receiver filter 110 illustrates roll-off in both sides of pass-band in practical filter design to suppress out of band signal. Signal spectrum 120 of transmitted signal is shown in FIG. 1. Due to phase noise and other impairments in the transmitted signal, there will be more or less certain side band emission. Consequently, a portion of the adjacent signal will be received by the receiver. Even though the receiver filter is carefully designed to suppress out of band signal and the transmit signal is well conditioned to reduce side band emission, the unintended signal from an adjacent channel could be substantial when the adjacent signal is strong. For example, when a locomotive passes by a base station, the signal transmitted from the locomotive at an adjacent channel will be perceived as a very strong signal by the base station. If an intended signal 130 is from a far-away locomotive, the intended signal 130 received by the receiver may be lower than the unintended signal 132 as shown in FIG. 1.

Figure 2:
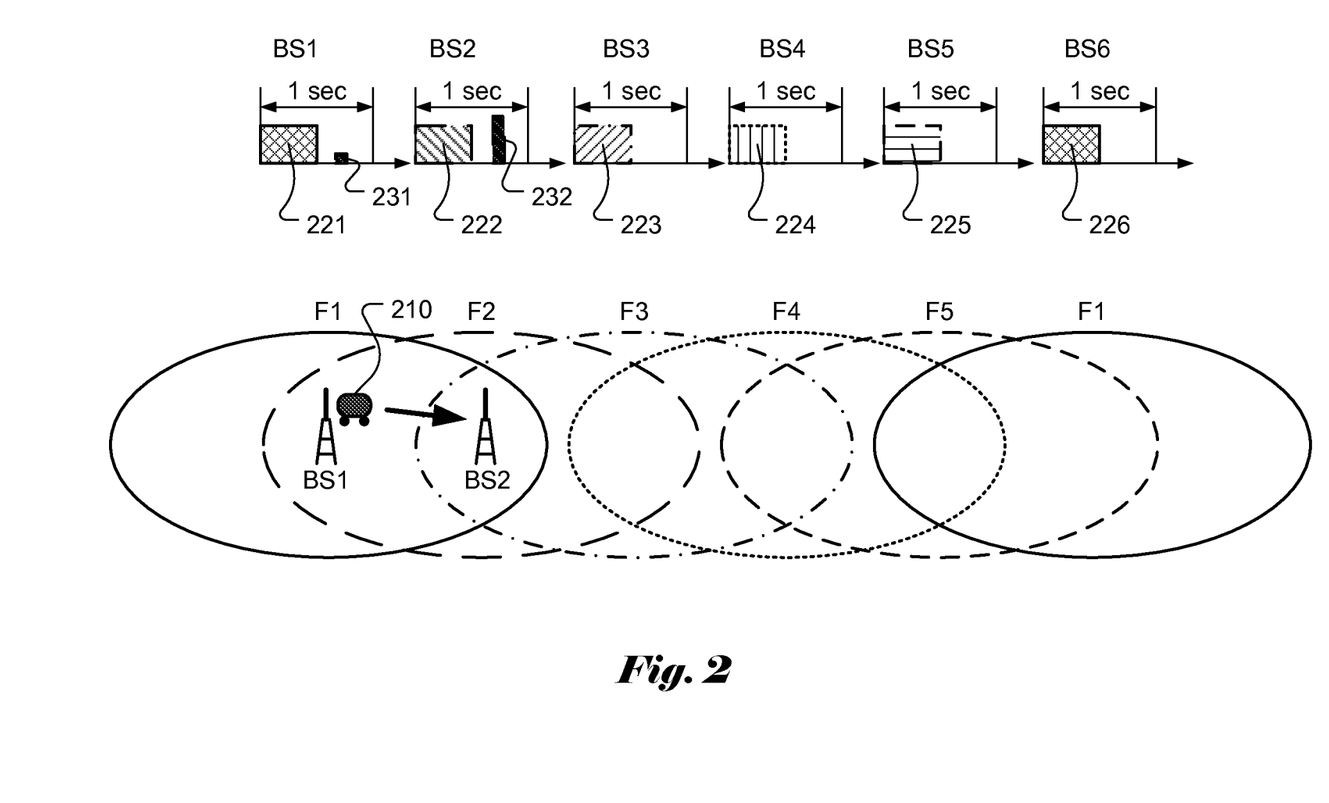
FIG. 2 illustrates an example of wireless train communication system using TDMA, where five channels are assigned according to a frequency plan and each TDMA frame is divided into time slots.

FIG. 2 illustrates a scenario of adjacent channel interference in a wireless train communication system. Each of five base stations (BS1 through BS5) is assigned a frequency for transmit and receive according to a frequency plan to minimize potential interference. Five channels (F1 through F5) are used by the five base stations. Base station BS6 can re-use frequency F1 to transmit since it is far away from base station BS1. The base stations are shown as linear configuration in FIG. 2 for simplicity. Nevertheless, the base stations are configured to cover the areas spanned by railroad tracks in a practical environment. The system uses TDMA (Time Division Multiple Access) for devices on the same channel to share the bandwidth. The time slots are synchronized among devices in the systems by using GPS information associated with each device. For each locomotive, the location information is frequently updated, such as every ten seconds so that the PTC system can take into consideration of the dynamic nature of the system and to help to synchronize the time slots. The location information can be provided using a location determination device such as a GPS (Global Positioning System) receiver.

FIG. 2 illustrates an example that data is divided into TDMA frames, where each frame corresponds to one second period and each time frame is divided into multiple time slots for devices on this channel to share. Some of the time slots in each TDMA frame can be designated for transmission from a base station to a locomotive and the associated communication link is called downlink in this disclosure. Other time slots can be designated for transmission from a locomotive to a base station and the associated communication link is called uplink in this disclosure. FIG. 2 illustrates a scenario that locomotive 210 is using frequency F2 to communicate with base station BS2 while locomotive 210 is close to base station BS1. The uplink signal 232 from locomotive 210 to base station BS2 is received by BS2 in a time slot. As shown in FIG. 2, the uplink signal 232 received at time slot is strong. Since locomotive 210 is close to base station BS1, adjacent channel interference causes transmitted signal from locomotive 210 to be also received by BS1 on the adjacent channel F1. Though the unintended signal 231 received by BS1 is small, the signal may be comparable or stronger than an intended signal corresponding to a far-away locomotive. Consequently, it should avoid simultaneous transmission of a weak intended transmission and a strong unintended transmission at an adjacent channel in the same time slot in order to establish a reliable wireless communication system.

Accordingly, embodiments of the present invention determine whether to allow a device, such as a locomotive, in a wireless train communication system to transmit or receive in a time slot by assessing signal quality of the respective uplink/downlink channel. The signal quality assessment is based on locations of devices and frequencies assigned to the devices within a neighborhood of a given device to receive an intended signal from an intended device. More specifically, distances among the devices are used for signal quality assessment. On the other hand, the frequency separations among other devices and the given device are used for signal quality assessment. The spectral characteristics of receiver filter for the devices can be pre-determined. The spectral characteristics of transmitted signal can also be pre-determined With the knowledge of receiver spectral characteristics, transmitter spectral characteristics, transmit power, distances among devices and frequency separations among devices, signal quality for intended signal and unintended signals can be evaluated. For example, the signal strength of the intended signal can be estimated based on the transmitted signal strength of the intended signal, the distance between the intended transmitter and receiver, and the receiver characteristics. The unintended signal strength can also be estimated similarly. Accordingly, the system can determine whether to allow an intended transmission in the time slot based on the results of quality assessment.

While the received signal quality can be estimated based on the transmitted signal, receiver characteristics and the distance between the transmitter and the receiver, the actual received signal estimation may vary widely depending on the terrain and other environmental factors. Therefore, while the distance based estimation provides an easy method to assess signal quality, it may not be accurate. In the field of wireless communication, there exist various techniques to measure receive signal strength indication (RSSI). The RSSI information can be used for more accurate signal quality assessment. Accordingly, in another embodiment of the present information, the RSSI information is used for signal quality assessment.

In an exemplary implementation of admission control, a device either for a base station or a locomotive may keep track information of all neighboring devices or use the information to determine whether to use a time slot for uplink or downlink. The neighboring devices include devices associated with base stations, locomotives and waysides in a neighborhood of a given device such as a base station or a locomotive. For example, a base station may keep track information of base stations, locomotives and waysides within 40 kilometers (km). Since each type of devices (base station, locomotive, and wayside) has its own characteristics, it will be more convenient to maintain information associated with each device type in a separate list. For example, locomotives are mobile, while base stations and waysides are stationary. Therefore, for each given device, three lists are maintained for base stations, locomotives and waysides separately. Information in the list may include the TX time slots (corresponding to the uplink from neighboring devices if the given device is a base station) and locations of the neighboring devices. Since locomotives are mobile, a GPS receiver may be used with each locomotive to update the location information frequently. The list may also include identification of intended receiver and the respective RSSI at the receiver side.

In an exemplary implementation of quality assessment for uplink channel for a given base station, the quality associated with each RX time slot of the base station can be evaluated based on the distance and the frequency difference between a device and the base station. The downlink analysis for a given base station can be performed similarly. The uplink/downlink analysis can also be applied to a given locomotive to assess signal quality. For each RX time slot at the base station, the n neighboring devices that transmit at this time slot are designated as $(t_0, t_1, \ldots, t_{n-1})$, where $t_0$ designates the intended device. There is a frequency associated with each device that transmits in the time slot. The frequency difference $F_{adj}$ between the intended transmitter $(t_0)$ and other transmitters $(t_i, i \neq 0)$ plays an important factor in determining potential adjacent channel interference. If the frequency difference is small, it poses a greater risk to cause adjacent channel interference. If such device is transmitting at a location far away from the base station, the risk of interference is reduced. Therefore, the risk of interference is high only for these devices that are transmitting in nearby channels as well as in a close distance. Accordingly, an unintended device that may cause adjacent channel interference can be determined if both conditions:

$$F_{adj} < F_{thr1}, \quad (1)$$

and $$D_{adj} < D_{thr1}, \quad (2)$$

are met, where $D_{adj}$ is the distance between the given base station and other transmitters $(t_i, i \neq 0)$, $F_{thr1}$ and $D_{thr1}$ are thresholds. If both conditions (1) and (2) are satisfied, the time slot for the intended transmitter will not be admitted since signal from the other transmitter may cause interference. If the thresholds are too low, a time slot may be unnecessarily rejected. If the thresholds are too high, the admitted time slot may not be reliable. Therefore, the thresholds have to be properly selected to achieve good compromise between system availability and system reliability. The frequency threshold $F_{thr1}$ may be dependent on the channel spacing. For example, $F_{thr1}$ can be selected as twice the channel spacing. If 25-kHz channel spacing is used, frequency threshold $F_{thr1}$ for the frequency difference can be selected as 50 kHz as an example. The distance threshold $D_{thr1}$ can be related to the distance $D_0$ between the intended transmitter and the given base station. For example, $D_{thr1} = C_1 \cdot D_0$ can be used, where $C_1$ is a constant and $C_1 = 8$ is used in an exemplary setting. The above thresholds are selected for illustration purpose and the values should be properly selected according to other system parameters.

The tests in equations (1) and (2) are sufficient to determine the risk of adjacent channel interference. However, when the frequency difference is larger than frequency threshold $F_{thr1}$, there may be still some risk of adjacent channel interference if the distance is too close. Optional secondary tests according to another embodiment of the present invention may be performed. For example, a secondary test can be performed:

$$F_{thr1} \leq F_{adj} < F_{thr2}, \quad (3)$$

and $$D_{adj} < D_{thr2}, \quad (4)$$

where $F_{thr2}$ and $D_{thr2}$ are second thresholds. If both conditions (3) and (4) are satisfied, the time slot for the intended transmitter will not be admitted since the other transmitter may cause interference. Again, second frequency threshold $F_{thr2}$ may be dependent on the channel spacing. For example, $F_{thr2}$ can be selected as four times of the channel spacing. If 25-kHz channel spacing is used, second frequency threshold $F_{thr2}$ for the frequency difference can be selected as 100 kHz. Also, second distance threshold $D_{thr2}$ can be related to the distance $D_0$ between the intended transmitter and the given base station. For example, $D_{thr2} = C2 \cdot D_0$ can be used, where C2 is a constant and $C_2 = 3$ is used in an exemplary setting. Again, the above thresholds are selected for illustration purpose and the values should be properly selected according to other system parameters.

Figure 3A:
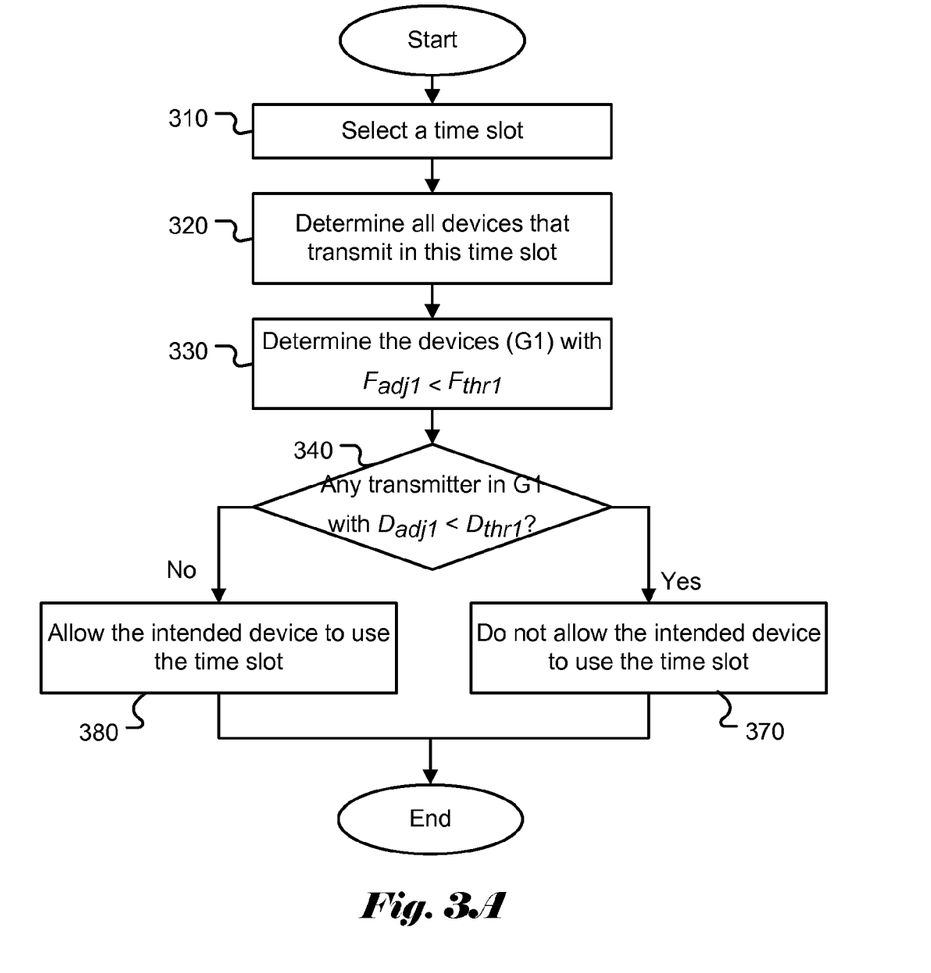
FIG. 3A illustrates an exemplary flowchart for implementing admission control with distance-based quality assessment according to an embodiment of the present invention.
Figure 3B:
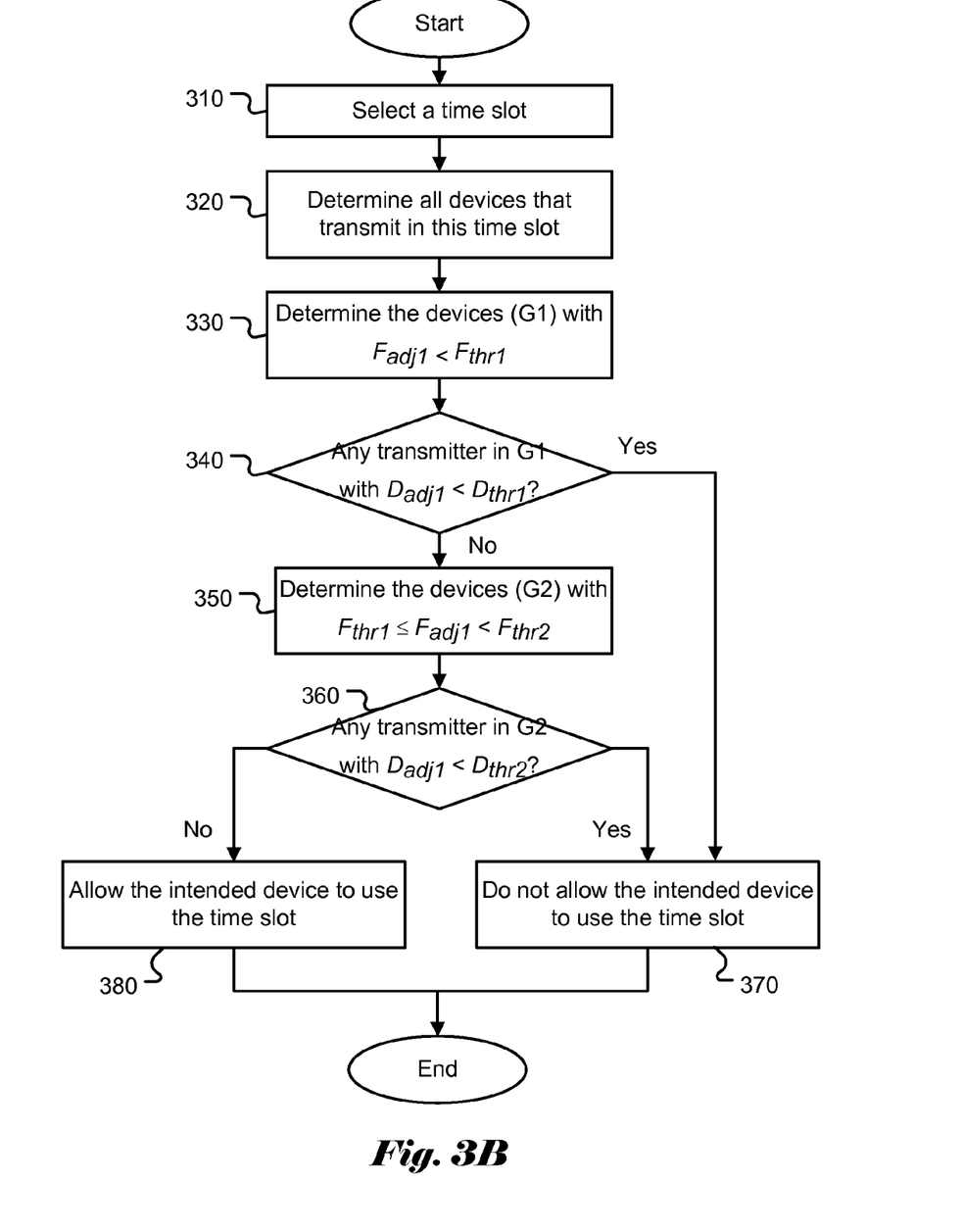
FIG. 3B illustrates an exemplary flowchart for implementing admission control with distance-based quality assessment according to another embodiment of the present invention.

The above exemplary determination of adjacent channel interference for uplink/downlink channel is summarized by the flowchart in FIG. 3A and FIG. 3B. The flowchart in FIG. 3A illustrates exemplary procedure to check if a time slot should be allowed for intended transmission. If the time slot should not be allocated due to potential adjacent channel interference, the system may continue to check if the next time slot is available. For a given time slot in step 310, the devices transmitting in the time slot are identified as shown in step 320. Furthermore, the devices with frequency distance smaller than frequency threshold $F_{thr1}$ are determined (the group is designated as G1) in step 330. If any device in G1 has a distance less than $D_{thr1}$ (step 340), the time slot is not allowed for the intended transmission (step 370). Otherwise, the time slot is allowed as shown in step 380. Optionally, additional tests can be performed to further check potential adjacent channel interference if $F_{thr1} \leq F_{adj1}$. Accordingly, $F_{adj1}$ is compared with another threshold $F_{thr2}$ and the devices with frequency distance, $F_{thr1} \leq F_{adj1} < F_{thr2}$ are determined (the group is designated as G2) in step 350 of FIG. 3B. If any device in G2 has a distance less than $D_{thr2}$ (step 360), the time slot is not allowed for the intended transmission (step 370).

Otherwise, the time slot is allowed for the intended transmitter to transmit as shown in step 380. The train system is a dynamic system due to mobile nature of the locomotives. In the admission control shown in FIG. 3A and FIG. 3B, the signal quality assessment estimates received signal based on distance. Accordingly, the technique is termed as AAA-D (ACR Avoidance Algorithm by Distance) in this disclosure. The link (uplink or downlink) analysis has to be performed once a while to reflect the constantly changing environment. For example, the uplink analysis may be performed every 30 seconds.

Besides uplink analysis, downlink analysis also has to be performed to ensure the signal quality in the downlink direction, i.e. the direction from base station to an intended device, such as a locomotive. The downlink analysis can be done for the intended receiver (i.e., locomotive) based on distances and frequency differences between the intended receiver and neighboring devices. Accordingly, information associated with distances and frequency differences for the intended locomotive and TX time slot and RSSI of neighboring devices are collected for the intended locomotive. The downlink analysis can be performed based on the procedure similar to that for the uplink analysis.

As mentioned before, receive signal strength indication (RSSI) can provide more accurate signal strength estimation than the distance-based estimation. Therefore, the AAA-D procedure shown in FIG. 3A and FIG. 3B can be replaced by AAA-S (ACR Avoidance Algorithm by Signal). In the AAA-S approach, the signal strength $S_{adj}$ is collected for the neighboring devices that transmit in the same time slot as the intended transmitter. While $S_{adj}$ represents the signal strength received by the unintended transmitter for the signal transmitted by the given base station, the signal strength of the uplink signal from the unintended transmitter to the base station can be estimated based on $S_{adj}$. Since the transmit power from the given base station is known, $S_{adj}$ provides a reliable indication of path loss, where both downlink and uplink should experience the same path loss. Therefore, if the transmit power for the unintended transmitter is know and the receiver filter characteristics of the given base station is known, the signal strength $S'_{adj}$ received by the base station for the transmitted signal from the unintended transmitter can be determined. The signal strength $S_0$ for the intended transmitter is compared with the estimated signal strength $S'_{adj}$ for unintended transmitter in an adjacent channel. If the estimated signal strength $S'_{adj}$ is too strong, there is a risk of adjacent channel interference. The distance test in FIGS. 3A-B is replaced by the estimated signal test:

$$(S_0 - S'_{adj}) < S_{thr1}, \quad (5)$$

where $S_{thr1}$ is the signal threshold and $S_{thr1}$ may be related to the minimum SNR (Signal to Noise Ratio) required for the receiver to operate properly. Since the AAA-S approach provides more accurate estimate for signal quality, a secondary test for devices at further adjacent channel may not be required. Nevertheless, a secondary test similar to that in FIG. 3B may also be used for the AAA-S based approach.

Figure 4A:
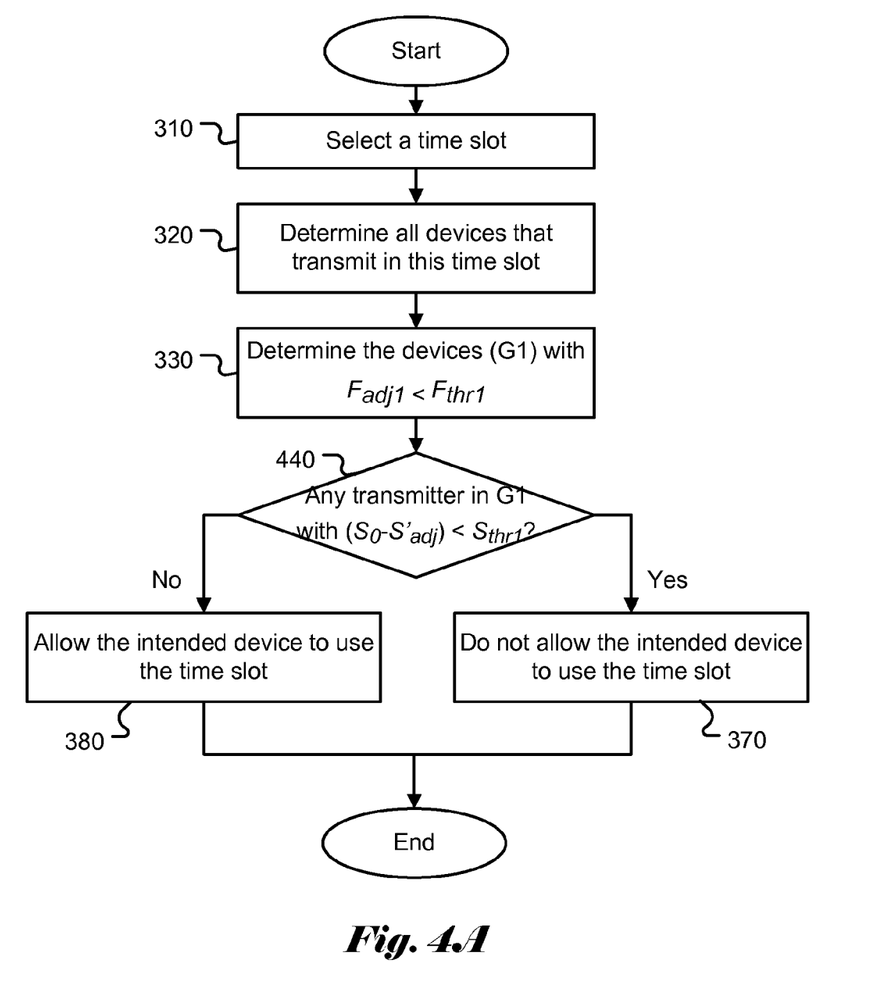
FIG. 4A illustrates an exemplary flowchart for implementing admission control with receive signal strength-based quality assessment according to an embodiment of the present invention.
Figure 4B:
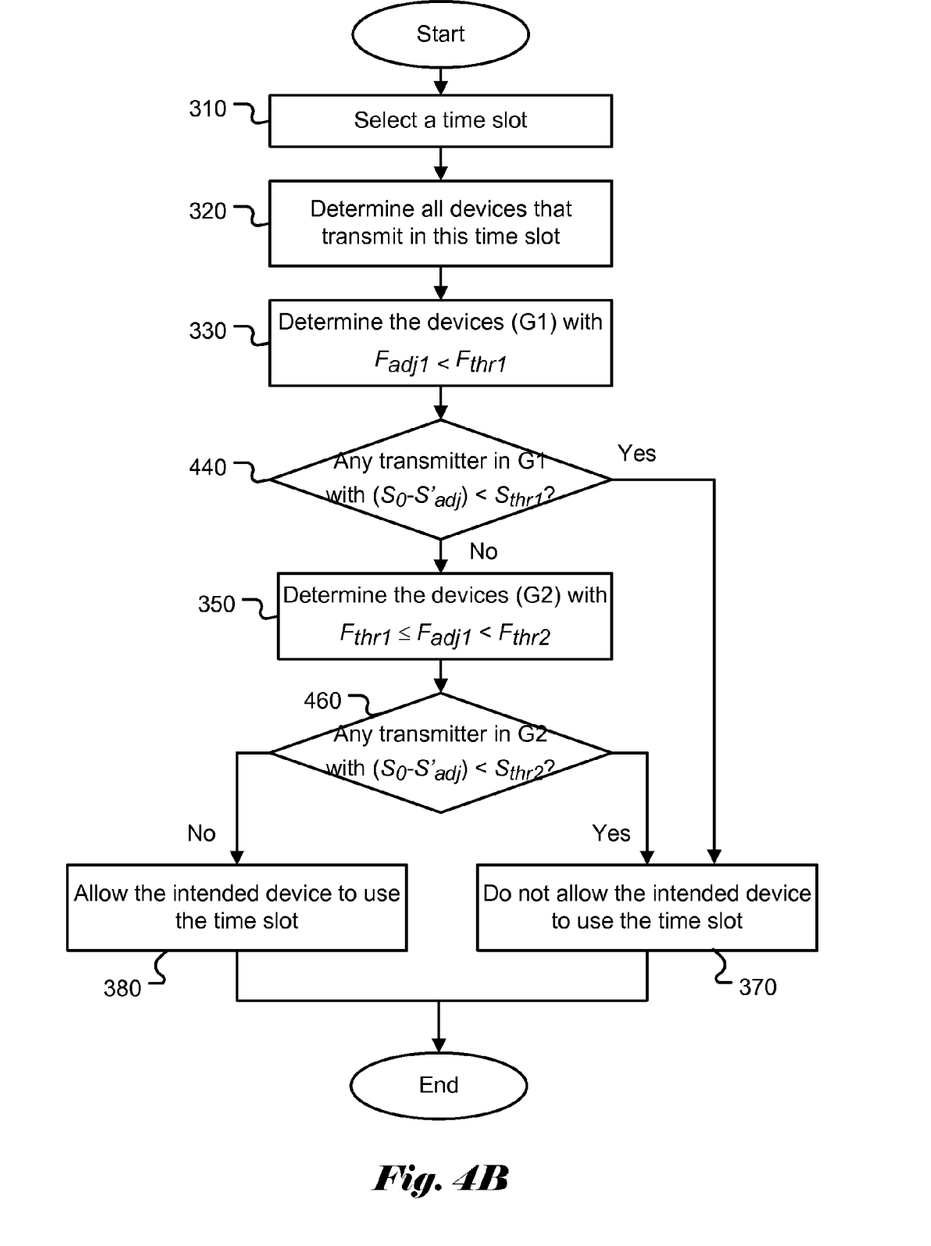
FIG. 4B illustrates an exemplary flowchart for implementing admission control with receive signal strength-based quality assessment according to another embodiment of the present invention.

The flowcharts in FIG. 4A and FIG. 4B illustrate exemplary procedure to determine whether a time slot should be allowed for intended transmission based on the AAA-S. The procedure is substantially the same as the procedure in FIGS. 3A-B and the same blocks are assigned the same reference numbers. If any device in G1 satisfies $(S_0 - S'_{adj}) < S_{thr1}$ (step 440 in FIG. 4A), the time slot is not allowed for the intended transmission (step 370). Otherwise, the time slot is allowed as shown in step 380 of FIG. 4A. Optionally, additional test can be performed to further check potential adjacent channel interference when $F_{thr1} \leq F_{adj}$. Accordingly, $F_{adj}$ is compared with another threshold $F_{thr2}$ and the devices with frequency distance, $F_{thr1} \leq F_{adj} < F_{thr2}$ are determined (the group is designated as G2) in step 350. If any device in G2 satisfies $(S_0 - S'_{adj}) < S_{thr2}$ (step 460 in FIG. 4B), the time slot is not allowed for the intended transmission (step 370). Otherwise, the time slot is allowed for the intended transmitter to transmit as shown in step 380.

In a wireless train communication system, both the uplink analysis and the downlink analysis are performed when a locomotive requests association with a base station. Upon the request, admission control is performed to check whether uplink and downlink should be granted for the requesting locomotive. The uplink analysis and the downlink analysis assess signal quality for uplink channel and downlink channel respectively. If any of the uplink analysis or downlink analysis indicates any adjacent channel interference, the admission for the requesting locomotive is declined. Otherwise, the request is admitted.

Embodiment of admission control for wireless train communication system according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for admission control in a wireless train communication system with TDMA, the method comprising:
   identifying an intended device for a given device, wherein the intended device communicates with the given device on a first channel at a first frequency;
   identifying a time slot associated with a communication link in a TDMA frame;
   identifying unintended devices within neighborhood of the given device that use the time slot;
   collecting second frequency information for each unintended device, wherein a second channel at a second frequency is associated with each unintended device, wherein the first channel and the second channel are substantially non-overlapping if the first channel and the second channel are not a same channel;

collecting first location information associated with the intended device, wherein the intended device is at first location;

collecting second location information associated with each unintended device, wherein each unintended device is at respective second location; and determining whether to grant the time slot based on the first frequency, the second frequencies associated with the unintended devices, the first location, and the second locations associated with the unintended devices;

wherein said determining whether to grant the time slot is based on frequency differences, wherein each frequency difference corresponds to first difference between the first frequency and each second frequency;

wherein a first group is identified and wherein the first group comprises the unintended devices having corresponding frequency differences less than a first frequency threshold; and wherein said determining whether to grant the time slot is based on first distances, wherein the first distances are determined for the unintended devices in the first group and wherein each first distance is derived from third location associated with the given device and each second location for each unintended device in the first group.

2. The method of claim 1, wherein the intended device is a locomotive device and the given device is a base station device.

3. The method of claim 1, wherein the second location information associated with each unintended device is determined with a GPS device with each unintended device.

4. The method of claim 1, wherein the intended device is a base station device and the given device is a locomotive device.

5. The method of claim 1, wherein the first frequency threshold is related to channel spacing of the wireless train communication system.

6. The method of claim 1, wherein the time slot is not granted if any of the first distances for the unintended devices in the first group is smaller than a first distance threshold.

7. The method of claim 6, wherein the first distance threshold is related to second distance between the intended device and the given device.

8. The method of claim 6, wherein said determining whether to grant the time slot is further based on a second group if all of the first distances for the unintended devices in the first group are greater than or equal to the first distance threshold, and wherein the second group comprises the unintended devices having corresponding frequency differences greater than or equal to the first frequency threshold and smaller than a second frequency threshold.

9. The method of claim 8, wherein said determining whether to grant the time slot is based on third distances, wherein the third distances are determined for the unintended devices in the second group and wherein each third distance is derived from the third location associated with the given device and each second location for the unintended device in the second group.

10. The method of claim 9, wherein the time slot is not granted if any of the distances for the unintended devices in the second group is smaller than a second distance threshold and the time slot is granted otherwise.

11. The method of claim 1, wherein said determining whether to grant the time slot grants the time slot if the frequency differences are greater than a threshold.

12. A method for admission control in a wireless train communication system with TDMA, the method comprising:

identifying an intended device for a given device, wherein the intended device communicates with the given device on a first channel at a first frequency;

identifying a time slot associated with a communication link in a TDMA frame;

identifying unintended devices within neighborhood of the given device that use the time slot;

collecting second frequency information for each unintended device, wherein a second channel at a second frequency is associated with each unintended device, wherein the first channel and the second channel are substantially non-overlapping if the first channel and the second channel are not a same channel;

collecting first receive signal strength associated with the intended device, wherein first receive signal strength corresponds to signal strength received by the intended device transmitted from the given device;

collecting second receive signal strength associated with each unintended device, wherein second receive signal strength corresponds to the signal strength received by each unintended device transmitted from the given device; and determining whether to grant the time slot based on the first frequency, the second frequencies associated with the unintended devices, the first receive signal strength, and the second receive signal strength associated with the unintended devices;

wherein said determining whether to grant the time slot is based on frequency differences, wherein each frequency difference corresponds to first difference between the first frequency and each second frequency;

wherein a first group is identified and wherein the first group comprises the unintended devices having corresponding frequency differences less than a first frequency threshold; and wherein said determining whether to grant the time slot is based on first distances, wherein the first distances are determined for the unintended devices in the first group and wherein each first distance is derived from third location associated with the given device and each second location for each unintended device in the first group.

13. The method of claim 12, wherein the time slot is not granted if any of first signal difference for the unintended devices in the first group is smaller than a first signal threshold, wherein each first signal difference corresponds to difference between the first receive signal strength and each second receive signal strength.

14. The method of claim 13, wherein said determining whether to grant the time slot is further based on a second group if all of the first receive signal strengths for the unintended devices in the first group are greater than or equal to the first signal threshold, and wherein the second group comprises the unintended devices having corresponding frequency differences greater than or equal to the first frequency threshold and smaller than a second frequency threshold; and wherein said determining whether to grant the time slot is further based on second signal differences, wherein the second signal differences are determined for the unintended devices in the second group and wherein each second signal difference corresponds to the difference between the first receive signal strength and each second receive signal strength of the unintended device in the second group.

15. The method of claim 14, wherein the time slot is not granted if any of the second signal differences for the unintended devices in the second group is smaller than a second signal threshold and the time slot is granted otherwise.

16. An apparatus for admission control in a wireless train communication system with TDMA, the apparatus comprising one or more electronic circuits configured to:
   identify an intended device for a given device, wherein the intended device communicates with the given device on a first channel at a first frequency;
   identify a time slot associated with a communication link in a TDMA frame;
   identify unintended devices within neighborhood of the given device that use the time slot;
   collect second frequency information for each unintended device, wherein a second channel at a second frequency is associated with each unintended device, wherein the first channel and the second channel are substantially non-overlapping if the first channel and the second channel are not a same channel;
   collect first location information associated with the intended device, wherein the intended device is at first location;
   collect second location information associated with each unintended device, wherein each unintended device is at respective second location; and
   determine whether to grant the time slot based on the first frequency, the second frequencies associated with the unintended devices, the first location, and the second locations associated with the unintended devices;
   wherein whether to grant the time slot is determined based on frequency differences, wherein each frequency difference corresponds to first difference between the first frequency and each second frequency;
   wherein a first group is identified and wherein the first group comprises the unintended devices having corresponding frequency differences less than a first frequency threshold; and
   wherein said determine whether to grant the time slot is based on first distances, wherein the first distances are determined for the unintended devices in the first group and wherein each first distance is derived from third location associated with the given device and each second location for each unintended device in the first group.

17. An apparatus for admission control in a wireless train communication system with TDMA, the apparatus comprising one or more electronic circuits configured to:
   identify an intended device for a given device, wherein the intended device communicates with the given device on a first channel at a first frequency;
   identify a time slot associated with a communication link in a TDMA frame;
   identify unintended devices within neighborhood of the given device that use the time slot;
   collect second frequency information for each unintended device, wherein a second channel at a second frequency is associated with each unintended device, wherein the first channel and the second channel are substantially non-overlapping if the first channel and the second channel are not a same channel;
   collect first receive signal strength associated with the intended device, wherein first receive signal strength corresponds to signal strength received by the intended device transmitted from the given device;
   collect second receive signal strength associated with each unintended device, wherein second receive signal strength corresponds to the signal strength received by each unintended device transmitted from the given device; and
   determine whether to grant the time slot based on the first frequency, the second frequencies associated with the unintended devices, the first receive signal strength, and the second receive signal strength associated with the unintended devices;
   wherein whether to grant the time slot is determined based on frequency differences, wherein each frequency difference corresponds to first difference between the first frequency and each second frequency;
   wherein a first group is identified and wherein the first group comprises the unintended devices having corresponding frequency differences less than a first frequency threshold; and
   wherein said determine whether to grant the time slot is based on first distances, wherein the first distances are determined for the unintended devices in the first group and wherein each first distance is derived from third location associated with the given device and each second location for each unintended device in the first group.

* * * * *